Oct. 1, 1968  G. H. KLUN  3,403,698
MICRO-VALVE
Filed Oct. 21, 1965  3 Sheets-Sheet 1

INVENTOR.
GODFREY H. KLUN
BY
ATTORNEY

Oct. 1, 1968

G. H. KLUN 3,403,698

MICRO-VALVE

Filed Oct. 21, 1965

INVENTOR.
GODFREY H. KLUN
BY
ATTORNEY

United States Patent Office 3,403,698
Patented Oct. 1, 1968

3,403,698
MICRO-VALVE
Godfrey H. Klun, Parma, Ohio, assignor to Union Carbide Corporation, a corporation of New York
Filed Oct. 21, 1965, Ser. No. 499,270
4 Claims. (Cl. 137—614.11)

ABSTRACT OF THE DISCLOSURE

The present invention pertains to a micro-valve capable of extreme throttling that utilizes a spring-like closure disc positioned between two surfaces, one of such surfaces having an inlet and the other of such surfaces having an outlet. Relative motion of the surfaces toward or away from each other compresses or releases the disc to effect fluid flow control.

---

This invention relates to micro-valves and more particularly to a novel micro-valve which is capable of adjusting the rate of flow of a fluid to an extremely low value.

A wide variety of micro flow valves and needle valves are available, but few if any, are capable of adjusting the flow of a fluid within a wide range of flow rates. More importantly, the presently available micro-valves cannot control the rate of fluid flow to an extremely low value.

It is the principal object of this invention, therefore, to provide a novel micro-valve which is capable of adjusting the flow rate of a fluid to an extremely low rate as well as to a relatively high rate.

Other objects and advantages will become apparent from the following description taken in conjunction with the accompanying drawings, wherein.

Broadly stated, the micro-valve of the invention comprises a curved disc so positioned as to partially close an orifice, and means to adjust the compression on the disc whereby the disc, with an increase in compression, further closes said orifice or with a decrease in compression, closes a smaller portion of the orifice, thereby adjusting the rate of fluid flow through said orifice. The flow rate of a fluid through the micro-valve of the invention is determined by the viscosity of the fluid and the pressure differential across the valve as well as the configuration of the disc due to the compression on the disc. The compression of the disc may be varied in any suitable manner as will hereinafter be described.

Figure 1:
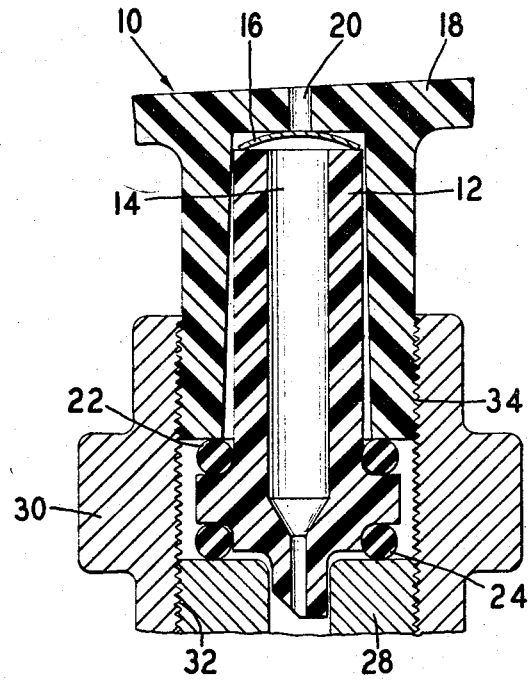
FIGURE 1 is a sectional view of one embodiment of the micro-valve of the invention.
Figure 4:
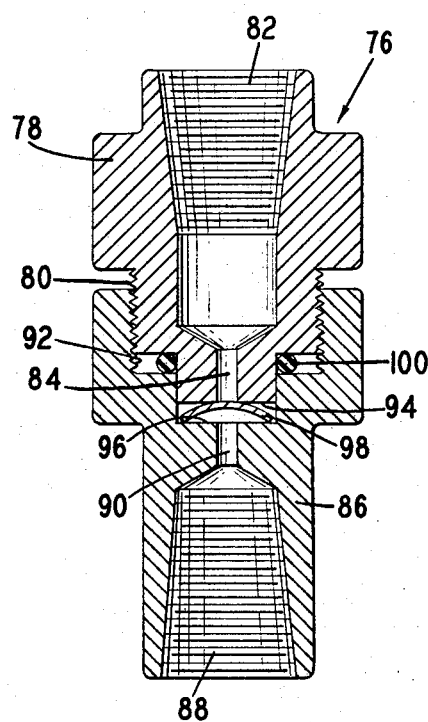
FIGURE 4 is a sectional view of another embodiment of the micro-valve of the invention.

The invention will more readily be understood by referring to the drawings and particularly FIGURES 1 and 4 which illustrate two embodiments of the invention.

Referring now to FIGURE 1, the micro-valve 10 comprises a housing 12 having a channel 14, a curved valve disc 16, an outer body member 18 having an orifice 20, and may include seal gaskets 22, 24. A fluid supply source 28 is shown engaging a collar 30 by means of threads 32. The outer body member 18 also engages the collar 30 by means of threads 34.

In operation, the fluid from the fluid supply source 28 flows through the channel 14 over the valve disc 16 and into the orifice 20. The flow rate of the fluid is actually affected by the configuration of the valve disc 16 due to mechanical compression on the disc. Changing the relative position of the outer body member 18 and the fluid supply source 28 is a convenient means of effecting a change in compression. This may be accomplished by rotating either the member 18 or the source 28 the desired number of turns. In this manner, the compression on the disc 16 may be controlled to a fine degree provided that the engaging threads are carefully designed and fitted. Any other suitable connection which will enable an accurate change in relative position between the housing 12 and the outer body member 18 to be effected may also be advantageously employed.

Figure 2:
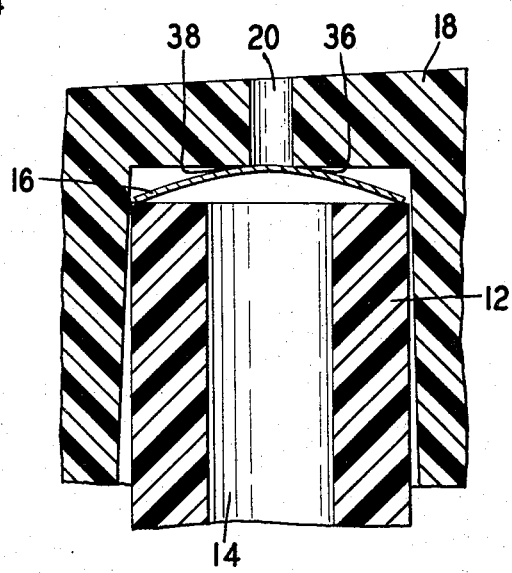
FIGURE 2 and FIGURE 2a are enlarged cross sectional views of the several operative positions of the micro-valve of FIGURE 1.
Figure 2A:
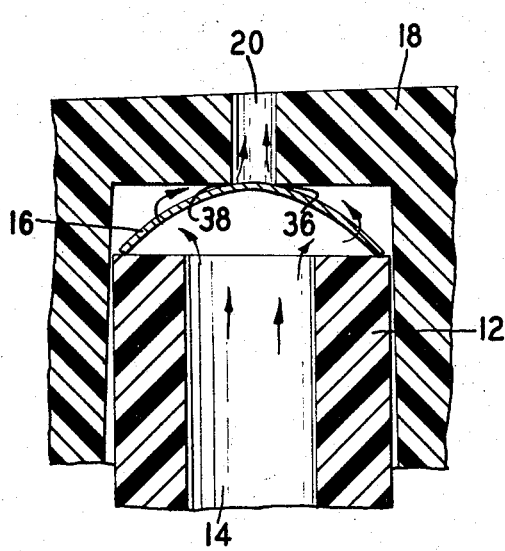

The operation of the micro-valve of the invention is further illustrated by the several operative positions which are shown in FIGURES 2 and 2a. FIGURE 2 illustrates the disc 16 in a compressed condition. The outer body member 18 and the housing 12 of the micro-valve 10 cooperate to exert a pressure on the disc 16 which is sufficient to nearly flatten the disc. Under this pressure, the flow path is narrow so that only a small stream of fluid can flow through the openings 36, 38 and into orifice 20 and therefore the flow rate is small. If a greater flow rate is desired, the housing 12 and the body 18 are spaced further apart, resulting in greater openings at 36, 38 and therefore, higher flow rates. FIGURE 2a illustrates this mode of operation. The arrows in FIGURE 2a illustrate the typical path of fluid flow through the valve. The curvature of the disc is exaggerated in FIGURE 2 since in actual practice the disc is nearly flattened by the applied compressive force when extremely low flow rates are desired. It will be appreciated that the disc may be sufficiently compressed so that the orifice 20 is completely closed thereby preventing fluid flow through the micro-valve.

Figure 5:
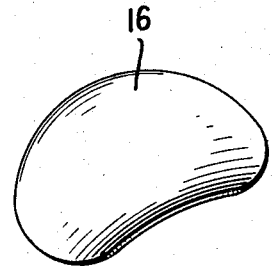
FIGURE 5 is a perspective view of an embodiment of a valve disc utilizable with the present invention.

The valve disc 16 shown in FIG. 5 is preferably cylindrical in shape. The desired shape is obtained by forming a flat piece into a cylindrical disc. The flat starting piece may be square, rectangular, circular or any suitable shape. A spherical disc may be satisfactorily employed if the orifice is displaced from the center portion of the disc and if at least one groove or slot is cut through the disc at its periphery. The disc may be composed of any suitable material such as extra hard brass. A disc having a radius of curvature of 1/4 inch has been successfully employed in combination with an orifice diameter of 1/32 inch.

The micro-valve of the invention is able to adjust the flow rate of a gas to 0.01 cubic feet per hour STP or lower, with a pressure drop of about 1 atmosphere across the valve. Conventional needle valves and other micro-valves yield minimum flow rates from 10 to 100 times larger than that which is accomplished by the valve of the invention.

An important feature of the micro-valve of the invention is the ability of the valve to be adjusted such that the flow rate of a fluid through the valve may be a very low to a fairly high value. It is obvious, however, that the micro-valve may be modified to eliminate adjustability in applications wherein a constant compression on the disc is desired. The modification may be accomplished by providing a suitable interference fit between the two members which together provide a suitable compression on the valve disc positioned between them. The flow path which results will be difficult if not impossible to vary.

The micro-valve of the invention is useful in many applications and particularly in devices wherein an adjustable or extremely low flow rate is desired. An embodiment of an automatic spray device in which the micro-valve of the invention is an essential component is illustrated in FIGURE 3.

Figure 3:
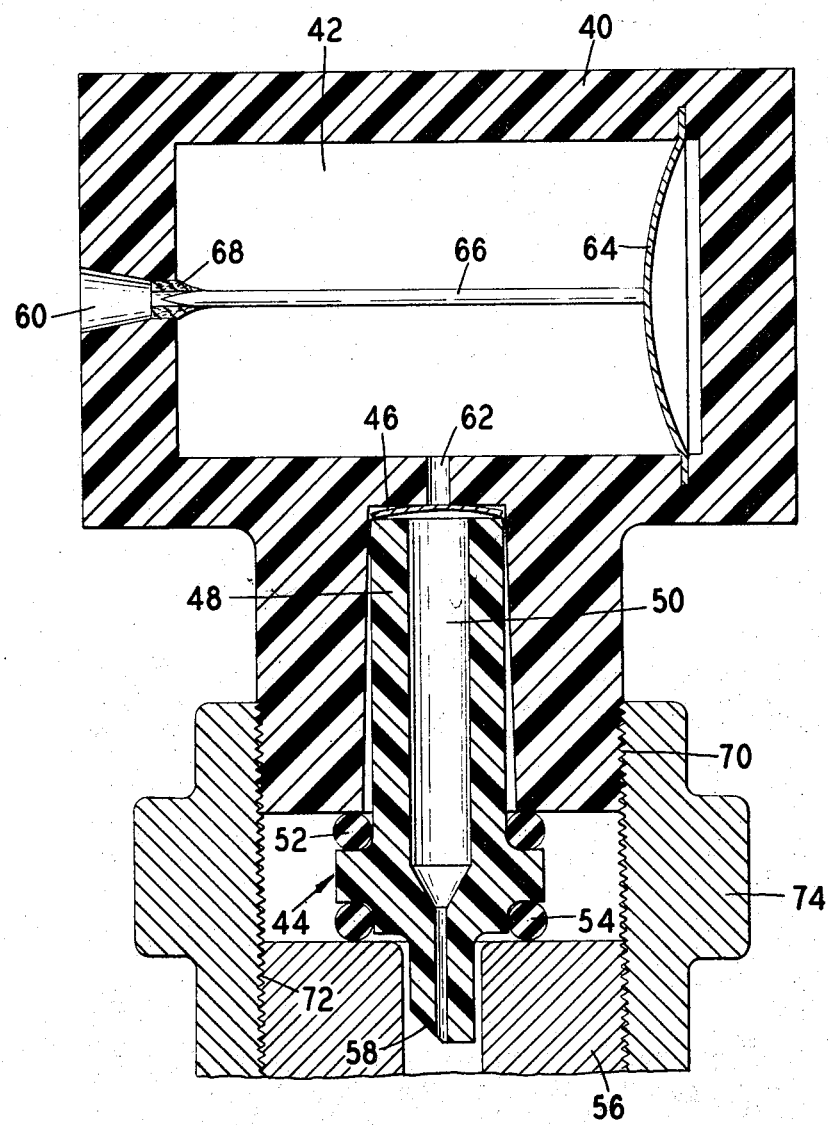
FIGURE 3 is a cross sectional view of an automatic spray device in which the micro-valve of the invention is an essential component.

Referring now to FIGURE 3, a housing 40 having a chamber 42 is mechanically connected to the micro-valve 44 and abuts valve disc 46 which forms a part of the micro-valve. The micro-valve 44 also includes the member 48 having a channel 50 therein, and gaskets 52, 54. Angled edge 58 of the member 48 provides a means whereby the propellant from pressure pack 56 can effectively escape. The housing 40 has an exit orifice 60 and an entrance aperture 62. Residing within the chamber 42 and secured to the housing 40 is a diaphragm disc 64. Attached to the disc 64 is a rod 66 which closes the orifice 60. Soft resilient seating means 68 provides an effective seal at the orifice 60. The device also includes threads 70, 72 and collar 74 whereby a variable compressive force is imparted to the valve disc 46 as hereinbefore described.

In operation, a propellant and a desired mixture which are both contained in the pressure pack 56 are released and together travel through the micro-valve 44, through the aperture 62 and into the chamber 42. When a sufficient quantity has accumulated in the chamber, the pressure within the chamber exerts a force upon the diaphragm disc 64 sufficient to cause it to snap into a second position. The movement of the diaphragm disc 64 causes the rod 66 to be drawn away from the seat 68 thereby permitting the propellant and the atomized mixture to escape through orifice 60. Because of the loss of pressure in the chamber 42 by this action, the diaphragm disc 64 returns to its initial position causing the rod 66 and the sealing means 68 to once again close the orifice 60. The cycle is then automatically repeated.

The flow rate of the propellant and the mixture into the chamber 42 may be adjusted by the change in configuration of the valve disc 46 in the same manner as has been hereinbefore described and illustrated in FIGURES 1, 2, and 2a by providing a relative change in position of the housing 40 and the member 48. In this manner, the dispensing cycle frequency of the spray device may be varied over a wide range of frequencies e.g. from 0 to 700 cycles per hour.

It will be appreciated that a wide variety of modifications may be made in the micro-valve of the invention without departing from the inventive concept contained therein. For example, the adjustable compression on the valve disc may be provided by the change in the relative position of a threaded protrusion in a similarly threaded recess. The embodiment of the invention in which this means of imparting a compressive force to the valve disc is employed is illustrated in FIGURE 4.

Referring now to FIGURE 4, the micro-valve 76 includes a male member 78 having a threaded portion 80 on its periphery and having a channel 82 which communicates directly with an orifice 84. A female member 86 having a channel 88 and an orifice 90 engages the male member 78 by means of threads 92. Situated between the front end face 94 of the male member 78 and the bottom 96 of the recess in the female member 86 is a disc 98. In the drawing, the disc 98 partially covers the orifice 84 in the male members 78 and regulates the flow of fluid through the valve 76. It is obvious that the disc 98 may be inverted and still perform the same function of limiting the flow of fluid through the male member 78 and the female member 86. A sealing means 100 is provided between the two members.

The operation of the micro-valve 76 is essentially as hereinbefore described, compression on the disc 98 being provided by rotating either the male member or female member a desired amount.

From the foregoing, it will be appreciated that the micro-valve of the invention can adjust the rate of fluid flow to an extremely low as well as to a relatively high value. In addition, the micro-valve is inexpensive, compact, and may be adapted for a wide variety of applications.

What is claimed is:

1. A micro-valve for controlling fluid flow comprising a first body member defining inlet orifice means, a second body member defining outlet orifice means, said inlet and outlet orifice means opening through respective surfaces of said body members which are juxtaposed in facing relationship and in close proximity to each other defining a narrow space therebetween through which flows the fluid to be controlled, a thin spring member positioned between said first and second body members within said narrow space, said spring member comprising a pair of oppositely facing surfaces, one of said surfaces facing said inlet orifice means and the other of said surfaces facing said outlet orifice means, said spring member being of a curved configuration and exerting a spring bias force opposing flattening of said spring member, and means operable to move the surfaces of said body member defining the openings of said orifice means apart and together thereby to effect said fluid flow control.

2. The micro-valve of claim 1 wherein said body member surfaces defining said narrow space are relatively positioned to firmly retain said spring member therebetween by the force of said spring bias.

3. The micro-valve of claim 1 wherein said means to move said body surfaces apart and together comprises threads on the periphery of said first body member and a threaded recess on said second body member, the threaded portions of said first and said second body members being in direct communication.

4. The micro-valve of claim 1 wherein said means to move said body surfaces apart and together comprises threads on said first body member and said second body member and a threaded collar in direct communication with the threaded portions of said first and said second body members.

References Cited

UNITED STATES PATENTS

| | | | |
|---|---|---|---|
| 1,399,013 | 12/1921 | Fleener. | |
| 1,890,126 | 12/1932 | Moore | 137—202 X |
| 2,016,390 | 10/1935 | Richardson | 251—361 X |
| 2,690,917 | 10/1954 | Chandler | 251—149.4 |
| 2,828,936 | 4/1958 | Hales | 251—361 X |
| 3,294,360 | 12/1966 | Lundberg | 251—205 |

FOREIGN PATENTS

| | | |
|---|---|---|
| 1,291,359 | 3/1962 | France. |

M. CARY NELSON, *Primary Examiner.*

R. C. MILLER, *Assistant Examiner.*